United States Patent
Hayashi

(10) Patent No.: US 6,487,616 B1
(45) Date of Patent: Nov. 26, 2002

(54) CONTROLLER FOR DATA RECORDER

(75) Inventor: Koji Hayashi, Hashima (JP)

(73) Assignee: Sanyo Electric Co., LTD (JP)

( * ) Notice: Subject to any disclaimer, the term of this patent is extended or adjusted under 35 U.S.C. 154(b) by 51 days.

(21) Appl. No.: 09/718,173

(22) Filed: Nov. 21, 2000

(30) Foreign Application Priority Data

Nov. 22, 1999 (JP) .......................................... 11-331417
Oct. 20, 2000 (JP) ...................................... 2000-321249

(51) Int. Cl.⁷ ............................. G06F 3/06; G06F 12/00
(52) U.S. Cl. ........................ 710/59; 369/47.32; 710/52; 711/111
(58) Field of Search ............................. 710/52, 53, 57, 710/58, 59, 60, 61; 711/4, 167, 111, 112; 369/47.32, 47.34

(56) References Cited

U.S. PATENT DOCUMENTS

| | | | |
|---|---|---|---|
| 5,212,678 A | 5/1993 | Roth et al. ............... | 369/47.33 |
| 5,220,545 A | 6/1993 | Tomimitsu ............... | 369/30.23 |
| 5,289,440 A | 2/1994 | Bakx ....................... | 369/30.23 |
| 5,436,875 A | 7/1995 | Shinada ................... | 369/30.23 |
| 5,463,607 A | 10/1995 | Roth et al. ............... | 369/47.33 |
| 5,491,677 A | 2/1996 | Sasaki ..................... | 369/44.36 |
| 5,532,991 A | 7/1996 | Sasaki ..................... | 369/44.35 |
| 5,745,445 A | 4/1998 | Yasukohchi et al. ..... | 369/30.23 |
| 5,815,472 A | 9/1998 | Kuroda et al. ........... | 369/47.33 |
| 5,818,801 A | 10/1998 | Watanabe et al. ........ | 369/30.23 |
| 5,910,935 A * | 6/1999 | Takagi et al. ............. | 369/47.34 |
| 5,953,291 A | 9/1999 | Yasukohchi et al. ........... | 710/57 |
| 6,055,216 A | 4/2000 | Shintani ................... | 369/47.31 |
| 6,115,337 A | 9/2000 | Takagi et al. ............. | 369/47.33 |
| 6,317,809 B1 * | 11/2001 | Kulakowski et al. ....... | 711/112 |

FOREIGN PATENT DOCUMENTS

| | | |
|---|---|---|
| JP | 2-223066 | 9/1990 |
| JP | 3-228266 | 10/1991 |
| JP | 10-49990 | 2/1998 |
| JP | 10-63433 | 3/1998 |
| JP | 2000-40302 | 2/2000 |

* cited by examiner

*Primary Examiner*—Gary J Portka
(74) *Attorney, Agent, or Firm*—Fish & Richardson P.C.

(57) ABSTRACT

A controller interrupts and restarts writing data from a buffer memory to a medium and prevents buffer underrun errors. The controller includes an address memory for storing a recording medium address or a buffer memory address, which indicate the location of the data when the interruption occurred. A synchronizing circuit sequentially reads data from the recording medium and data from the buffer memory prior to the interruption while synchronizing the written data and the stored data. A restart circuit restarts writing data when the recording medium address or the buffer memory address matches the address stored in the address memory.

11 Claims, 3 Drawing Sheets

CONTROLLER FOR DATA RECORDER

BACKGROUND OF THE INVENTION

The present invention relates to a data recorder, and more particularly, to a controller for a data recorder which has a buffer memory for storing data provided from an external device and records the stored data of the buffer memory on a recording medium.

An optical disc recorder records data on an optical disc, which serves as a recording medium. A CD-DA family compact disc-recordable (CD-R) drive is one type of optical disc recorder that is widely used. A CD-R is a so-called write-once optical disc on which data is written only once. The recorded data cannot be physically deleted. A laser beam is irradiated against the optical disc from an optical head of the CD-R drive. The heat of the laser beam melts a dye and forms recording pits on a recording layer of the optical disc. Data is recorded on the disc by changing the reflecting rate of the recording layer.

The optical disc recorder includes a buffer memory and an encoder. The buffer memory temporarily stores data provided from an external device, such as a personal computer. The encoder reads the data from the buffer memory and encodes the read data to record the data on the optical disc.

In such an optical disc recorder, if, for example, the rate of data transmission from the external device is slower than the recording data transmission rate of the optical disc (write speed), the transmission rate of the recording data output from the encoder is faster than the transmission rate of the data provided to the buffer. This decreases the amount of data stored in the buffer memory. If the decrease continues, the data amount ultimately becomes null and the buffer memory becomes empty. This stops the stream of data to the encoder and causes an interruption in the data recorded on the optical disc. This problem is referred to as buffer underrun. The interruption in the data recorded on the optical disc resulting from buffer underrun is referred to as a buffer underrun error.

Data is recorded on an optical disc using a recording technique that designates the file group recorded on the optical disc (e.g., disc at once, track at once). Thus, if a buffer underrun error occurs, the entire optical disc becomes unusable when employing disc at once, and the track undergoing recording becomes unusable when employing track at once.

Recent CD-R drives record data at a speed four times or eight times the normal recording speed. Further, recent personal computers have multitasking functions to operate CD-R drives. This has increased the tendency of the occurrence of buffer underrun errors.

Packet writing is one type of data recording that records data in packet units. Packet writing records data on an optical disc when the data reaches the capacity of the packet. This prevents the occurrence of buffer underrun errors. However, link blocks must be formed to connect packets in packet writing. The link blocks decrease the recording capacity of the optical disc. Further, there are CD-ROM drives that are not capable of handling packet writing. Such CD-ROM drives cannot reproduce data written to optical discs through packet writing. In other words, the CD-ROM compatibility required by the CD-R standard (Orange Book Part II) does not include packet writing. For example, packet writing cannot be applied for a CD-DA player. Thus, a CD-R drive cannot record CD-DA audio data through packet writing. Accordingly, there is a need for preventing buffer underrun errors without employing packet writing.

A CD-rewritable (CD-RW) drive is another type of optical disc recorder that is widely used. A CD-RW drive irradiates a laser beam from an optical head against an optical disc. The heat of the laser beam causes phase changes between amorphic and crystalline to form recording pits on the recording layer of the optical disc. This changes the reflecting rate of the recording layer and records data on the optical disc. Data can be repeatedly rewritten to optical discs used by the CD-RW drive. Accordingly, the optical disc remains usable even if a buffer underrun error occurs. However, when a buffer underrun error occurs, the data file that was being recorded before the occurrence of the buffer underrun error must be recorded again. This wastes the recording performed prior to the occurrence of the buffer underrun error and increases the recording time.

A magneto-optic disc recorder is another type of known data recorder. The magneto-optic disc recorder irradiates a laser beam from an optical head against a magneto-optic disc. This applies residual magnetization to the recording layer of the optical disc and records data on the magneto-optic disc. Mini disc (MD) drives are widely used magneto-optic disc recorders. However, MD drives have the same problem as CD-RW drives.

SUMMARY OF THE INVENTION

It is an object of the present invention to provide a controller for a controller for a data recorder that controls data recording in a manner that the continuity of the data is ensured even if the recording of data to a recording medium is interrupted.

To achieve the above object, the present invention provides a controller for interrupting and restarting data writing to a recording medium. The data is read from a buffer memory. The controller includes an address memory for storing at least one of an address of the recording medium and an address of the buffer memory when the writing of data to the recording medium is interrupted. Each address indicates a location of data when the interruption occurred. A synchronizing circuit sequentially reads data written to the recording medium prior to the interruption and data stored in the buffer memory prior to the interruption and synchronizes the written data and the stored data. A restart circuit restarts data writing to the recording medium when at least one of an address of data read from the recording medium and an address of data read from the buffer memory matches the address stored in the address memory. The restart circuit suspends the restarting and the synchronizing circuit repeats the reading and synchronizing of data when one of the address of the data read from the recording medium and the address of the data read from the buffer memory matches the address stored in the address memory before the synchronizing circuit completes the data synchronization.

A further aspect of the present invention provides a controller for interrupting and restarting data writing to a recording medium. The data is read from a buffer memory. The controller includes a first address memory for storing an address of the recording medium when the data writing is interrupted. The recording medium address indicates a location of data when the interruption occurred. A second address memory stores an address of the buffer memory when the writing of data to the recording medium is interrupted. The buffer memory address indicates a location of the data when the interruption occurred. A synchronizing circuit sequentially reads the data written to the recording medium prior to the interruption and the data stored in the buffer memory prior to the interruption while synchronizing the written data and the stored data. A first location detection circuit generates a first instruction signal to restart data writing when the address of the data read from the recording medium matches the address stored in the first address memory. A second location detection circuit generates a second instruction signal to restart data writing when the address of the data read from the buffer memory by the synchronizing circuit matches the address stored in the second address memory. A determination circuit is connected to the first and second location detection circuits to determine whether to restart the writing of data based on the first and second instruction signals.

Another aspect of the present invention provides a method for controlling data writing to a recording medium when writing is interrupted. The data is read from a buffer memory. The method includes storing at least one of an address of the recording medium and an address of the buffer memory in an address memory when writing to the recording medium is interrupted. Each address indicates a location of the data when the interruption occurred. The method further includes sequentially reading data written to the recording medium prior to the interruption and the data stored in the buffer memory prior to the interruption, synchronizing the written data and the stored data, restarting the writing of data to the recording medium when at least one of an address of the data read from the recording medium and an address of the data read from the buffer memory by the synchronizing circuit matches the address stored in the address memory, and repeating the data reading and the data synchronizing when the address of the data read from the recording medium or the address read from the buffer memory matches the address stored in the address memory before completion of the data synchronization in the data synchronization step.

A further aspect of the present invention provides a method for controlling data writing to a recording medium when writing is interrupted. The data is read from a buffer memory. The method includes storing an address of the recording medium when writing of data to the recording medium is interrupted and storing an address of the buffer memory when the writing of data to the recording medium is interrupted. The recording medium address indicates a location of the data when the interruption occurred. The buffer memory address indicates a location of the data when the interruption occurred. The method further includes sequentially reading the data written to the recording medium prior to the interruption and the data stored in the buffer memory prior to the interruption, synchronizing the written data and the stored data, generating a first instruction signal to restart data writing when the address of the data read from the recording medium matches the address stored in the first address memory, generating a second instruction signal to restart data writing when the address of the data read from the buffer memory by the synchronizing circuit matches the address stored in the second address memory, and determining whether to restart the writing of data based on the first and second instruction signals.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
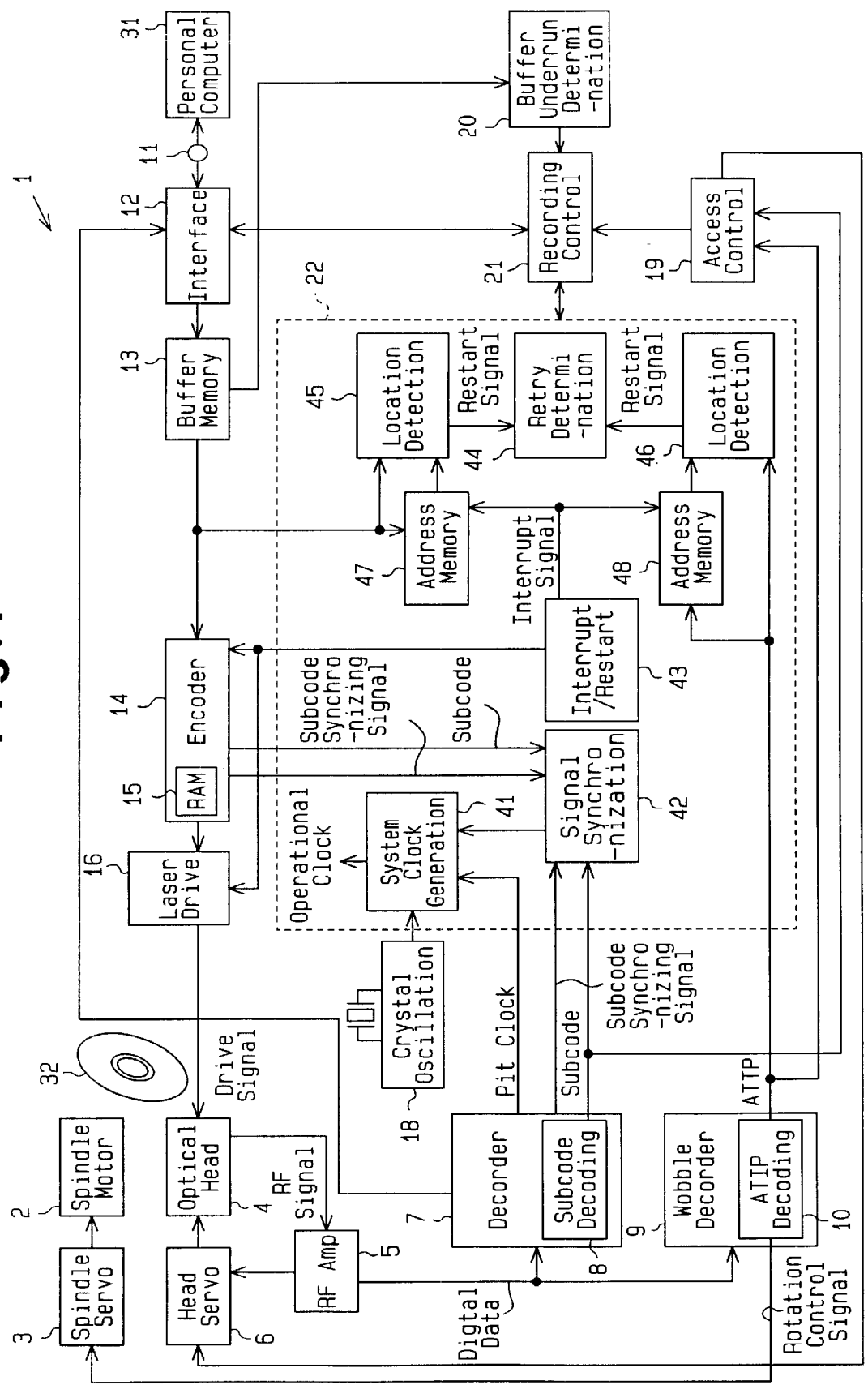
FIG. 1 is a schematic block diagram showing a CD-R drive according to a preferred embodiment of the present invention.

With reference to FIG. 1, a CD-R drive 1 includes a spindle motor 2, a spindle servo circuit 3, an optical head 4, an RF amplifier 5, a head servo circuit 6, a decoder 7, a subcode decoding circuit 8, a wobble decoder 9, an ATIP decoding circuit 10, an external connection terminal 11, an interface 12, a buffer memory 13, an encoder 14, an encoder internal RAM 15, a laser drive circuit 16, a crystal oscillation circuit 18, an access control circuit 19, a buffer underrun determination circuit 20, a recording control circuit 21, and a system control circuit 22. The CD-R drive 1 is connected to a personal computer 31 via the external connection terminal 11 to record data, which is provided from the personal computer 31, on an optical disc 32 that complies with the CD-R standards. Further, the CD-R drive 1 provides the personal computer 31 with data reproduced from the optical disc 32.

The spindle motor 2 rotates the optical disc 32. The spindle servo control circuit 3 controls the spindle motor 2 so that the optical disc 32 is rotated using the constant linear velocity (CLV) method in accordance with the rotation control signal generated by the wobble decoder 9.

When reading data, the optical head 4 irradiates a relatively weak laser beam against the optical disc and, from the reflected laser beam, generates a RF signal (high frequency signal) in correspondence with the data recorded on the optical disc. When recording data, the optical head 4 irradiates a relatively intense laser beam (several tens of times greater than the data reading laser beam) against the optical beam 32 to form recording pits on the recording layer of the optical disc 32 and change the reflecting rate of the recording layer to record data. In synchronism with the recording of data, the optical head 4 generates the RF signal in correspondence with the recorded data from the reflected laser beam.

The RF amplifier 5 amplifies the RF signal, which is provided from the optical head 4, and digitizes the amplified RF signal to generate a digital data signal. The RF signal of the optical head 4 is fed back to the head servo circuit 6 via the RF amplifier 5. The head servo circuit 6 uses the RF signal to perform focusing control, tracking control, and sled feed control. Focusing control focuses the laser beam on the recording layer of the optical disc 32. Tracking control tracks the laser beam along a signal track of the optical disc 32. Sled feed control moves the optical head 4 in the radial direction of the optical disc 32.

The decoder 7 decodes the digital data provided from the RF amplifier 5. Further, the decoder 7 generates a pit clock from the digital data and separates a subcode from the digital data to generate a subcode synchronizing signal.

The subcode decoding circuit 8, which is incorporated in the decoder 7, decodes the subcode. Further, the subcode decoding circuit 8 generates subcode Q channel data (hereafter referred to as sub-Q data) from the decoded subcode.

The wobble decoder 9 extracts a wobble component of 22.05 kHz from a pre-groove signal of the optical disc 32 that is included in the digital data provided from the RF amplifier 5. Then, the wobble decoder generates the rotation control signal of the optical disc 32 from the wobble component.

The ATIP decoding circuit 10, which is incorporated in the wobble decoder 9, uses the wobble component to decode an absolute time in pre-groove (ATIP) and extract absolute time information, or an ATIP address, from the ATIP. The absolute time information indicates addresses of locations in the recording medium.

The interface 12 controls data transmission between the personal computer 31 and the CD-R drive 1.

The buffer memory 13 is a ring buffer that includes a synchronous dynamic random access memory (SDRAM), which preferably has a FIFO configuration, and the buffer memory 13 stores data provided from the personal computer 31 via the interface 12. Data stored at one address of the buffer memory 13 corresponds to data recorded at one sector of the optical disc 32.

An interrupt/restart circuit 43 of the system control circuit 22 controls the encoder 14. The encoder 14 reads the data stored in the buffer memory 13 in sector units and encodes the data into recording data for the optical disc 32. The RAM 15, which is incorporated in the encoder 14, stores the necessary data for encoding by the encoder 14 and intermediate operation encoding data. When performing data encoding in compliance with the CD-ROM standard, the encoder 14 adds a synch byte, a header, CD-ROM data error detection code (EDC), and an error correction code (ECC) to the data. The encoder 14 further performs error correction using a cross interleaved Reed-Solomon code (CIRC), which is a CD error correction code, and eight to fourteen modulation (EFM) on the data. Further, the encoder 14 adds a subcode, which includes the sub-Q data, and a synchronizing signal of the subcode to the data.

The interrupt/restart circuit 43 also controls the laser drive circuit 16, which provides a laser drive signal to the laser beam source of the optical head 4. The voltage of the drive signal is constant when reproducing data and varied in accordance with the recording data output from the encoder 14 when recording data. When the recording data output from the encoder 14 is low (L), recording pits are not formed on the recording layer of the optical disc 32. Thus, the drive signal is set so that its voltage is the same as when data is reproduced. When the recording data is high (H), recording pits are formed on the recording layer of the optical disc 32. Thus, although the voltage of the drive signal differs between track positions, the drive signal is set so that its voltage is several tens of times greater than during data reproduction.

The crystal oscillation circuit 18 generates an oscillation signal based on the oscillation of a crystal oscillator.

The access control circuit 19 selectively refers to the subcode address of the absolute time information in the sub-Q data and the ATIP address of the absolute time information in the ATIP to control the recording control circuit 21 and the head servo circuit 6. This controls access to the optical disc 32.

The data provided to the buffer memory 13 is stored in the buffer memory 13 in a predetermined address order. The buffer underrun determination circuit 20 directly or indirectly determines the amount of data stored in the buffer memory 13 from the address at which writing or reading is presently performed. Based on the data amount, the buffer underrun determination circuit 20 determines whether or not the buffer memory 13 is in a state in which buffer underrun may occur.

Based on the determination result of the buffer underrun determination circuit 20 and in response to a command provided from the personal computer 31, the recording control circuit 21 controls the interface 12, the access control circuit 19, and the system control circuit 22.

The system control circuit 22 includes a system clock generation circuit 41, a signal synchronizing circuit 42, the interrupt/restart circuit 43, a retry determination circuit 44, location detection circuits 45, 46, and address memories 47, 48. These circuits 41–48 are laid out on the same chip of an LSI substrate.

The system clock generation circuit 41 generates from the oscillation signal of the crystal oscillation circuit 18 a reference clock used when recording data. Further, the generation circuit 41 uses a pit clock extracted by the decoder 7 to generate a reproduction clock used when reproducing data. The generation circuit 41 selects the reference clock or the reproduction clock in accordance with the switching control performed by the signal synchronizing circuit 42. The selected clock is used as a system operational clock of the CD-R drive 1. In accordance with the operational clock, the CD-R drive 1 controls the synchronization of the circuits 7–10, 12–16, and 19–22.

In accordance with the synchronizing signal of the subcode from the decoder 7 and the sub-Q data from the subcode decoding circuit 8, the signal synchronizing circuit 42 controls the recording control circuit 21 so that the recording data output from the encoder 14 is synchronized with the data recorded on the optical disc 32. When performing this control, the sub-Q data of the subcode decoding circuit 8 is associated with the sub-Q data of the encoder 14 after synchronizing the subcode synchronizing signal of the decoder 7 with the subcode synchronizing signal of the encoder 14. The signal synchronizing circuit 42 controls the system clock generation circuit 41 so that the reference clock or the reproduction clock is output.

The recording control circuit 21 controls the interrupt/restart circuit 43. The interrupt/restart control circuit 43 controls the encoder 14 and the laser drive circuit 16 and, when the buffer underrun determination circuit determines that the buffer memory 13 has entered a state in which buffer underrun may occur, provides the address memories 47, 48 with a recording interrupt signal.

The address memory 47 stores the address of the read data in the buffer memory 13 when receiving the recording interrupt signal from the interrupt/restart circuit 43.

The address memory 48 stores the address of the ATIP decoded by the ATIP decoding circuit 10 when receiving the recording interrupt signal from the interrupt/restart circuit 43.

When data is reproduced during a recording restart mode (described later), the location detection circuit 45 compares the address of the data read from the buffer memory 13 with the address stored in the address memory 47. If the data address and the stored address are the same, the location detection circuit 45 activates the recording restart signal.

When data is reproduced during the recording restart mode, the location detection circuit 46 compares the address of the ATIP decoded by the ATIP decoding circuit 10 with the ATIP address stored in the address memory 48. If the decoded ATIP address and the stored ATIP address are the same, the location detection circuit 46 activates the recording restart signal.

The retry determination circuit 44 instructs the recording control circuit 21 to restart the recording operation of the interface 12, the access control circuit 19, and the system control circuit 22 when the restart signals of the location detection circuits 45, 46 are simultaneously activated. When the two restart signals are not synchronously activated (when the restart signals are activated at different timings), the retry determination circuit 44 instructs the control circuit 21 to repeatedly perform data reproduction in the recording restart mode until the two restart signals are synchronously activated.

The operation of the CD-R drive 1 will now be discussed.

When a user manipulates the personal computer 31 to record data, the personal computer 31 generates a command accordingly. The command is transferred to the recording control circuit 21 via the interface 12. In response to the command, the recording control circuit 21 controls the interface 12, the access control circuit 19, and the system control circuit 22 to record data.

When recording begins, the signal synchronizing circuit 42 switches the operational clock output of the system clock generation circuit 41 to the reference clock. As a result, the circuits 7–10, 12–16, 19–22 of the CD-R drive 1 are synchronized with the operational clock, or the reference clock.

The data provided from the personal computer 31 is stored in the buffer memory via the interface 12 and read from the buffer memory 13 in sector units. The encoder 14 encodes the data read from the buffer memory 13 in sector units to generate recording data. The laser drive circuit 16 provides the optical head 4 with drive signal having a voltage corresponding to the recording data. In accordance with the drive signal, the optical head 4 changes the intensity of the laser beam irradiated against the optical disc 32. This forms recording pits on the recording layer of the optical disc 32 and records data on the optical disc 32. Simultaneously, from the laser beam reflected by the optical disc 32, the optical head 4 reproduces the data recorded on the optical disc 32 as the RF signal. The RF amplifier 5 amplifies the RF signal provided from the optical head 4 to generate digital data. The wobble decoder 9 extracts the wobble component from the digital data and uses the wobble component to generate the rotation control signal. In accordance with the rotation control signal, the spindle servo circuit 3 controls the spindle motor 2 so that the optical disc 32 is rotated at a constant linear velocity. The ATIP decoding circuit 10 decodes the ATIP using the wobble component and extracts the ATIP address of the absolute time information in the ATIP.

When the transmission rate of the data provided from the personal computer 31 is slower than the transmission rate of the data recorded in the optical disc 32 (write speed), that is, when the transmission rate of the data provided to the buffer 13 is slower than that of the data output from the encoder 14, the amount of data stored in the buffer memory 13 decreases. When the buffer underrun determination circuit 20 determines that a buffer underrun error may occur in the buffer memory 13, the recording control circuit 21 controls the interrupt/restart circuit 43 so that, before the occurrence of a buffer underrun in the buffer memory 13, the address memories 47, 48 are accordingly provided with the interrupt signal and the output of recording data from the encoder 14 is interrupted. In response to the interrupt signal, the address memories 47, 48 store the data address of the buffer memory 13 when receiving the interrupt signal. In other words, the address memory 47 stores the buffer memory address of the data read from the buffer memory 13 when receiving the interrupt signal. The address memory 48 stores the ATIP address of the ATIP decoding circuit 10 when receiving the interrupt signal.

The buffer underrun determination circuit 20 is set so that it determines that there is a possibility of the occurrence of a buffer underrun when one or more sectors of data still remain in the buffer memory 13. When the interrupt/restart circuit 43 outputs the interrupt signal based on the determination result of the buffer underrun determination circuit 20, the sector of the data being output from the (encoder 14) is recorded on the optical disc 32. The interrupt signal of the interrupt/restart circuit 43 may be output at times between sectors of the recording data. In this case, the address is recorded in correspondence with the sector unit when the recording is interrupted. This allows the capacity of the address memory to be decreased and ensures data continuity after entering the recording restart mode.

Subsequent to the recording interruption, the data provided from the personal computer 31 is stored in the buffer memory 13 via the interface 12. As the amount of data stored in the buffer memory 13 increases, the state in which a buffer underrun may occur no longer exists. When the buffer underrun determination circuit 20 determines that buffer underrun is not likely to occur, the recording control circuit 21 controls the access control circuit 19 and the system control circuit 22 to perform data reproduction in the recording restart mode.

When data reproduction is performed in the recording restart mode, the access control circuit 19 controls the head servo circuit 6. The head servo circuit 6 controls focusing, tracking, and sled feed of the optical head 4 to move the optical head 4 to a sector location that is prior by a predetermined number of sectors from the sector at which the recording interruption occurred. The optical head 4 then irradiates the laser beam from that sector location.

The interrupt/restart circuit 43 controls the laser drive circuit 16 so that a drive signal having a constant voltage is output from the laser drive circuit 16. This results in the optical head 4 irradiating the optical disc 32 with a relatively weak laser beam. The reflected laser beam reproduces the data recorded on the optical disc prior to the recording interruption, and the optical head 4 outputs the RF signal. The RF signal is amplified by the RF amplifier 5 and converted to digital data. The decoder 7 decodes the digital data, extracts a pit clock from the digital data, and separates a subcode from the digital data. A subcode synchronizing signal is generated from the subcode. The subcode is decoded by the subcode decoding circuit 8 to generate the sub-Q data.

When data reproduction in the recording restart mode is started, the signal synchronizing circuit 42 switches the operational clock from the reference clock of the crystal oscillation circuit 18 to the reproduction clock of the decoder 7. The circuits 7–10, 12–16, 19–22 of the CD-R drive 1 are operated in accordance with the reproduction clock. By using the reproduction clock, the data recorded on the optical disc 32 prior to the recording interruption is accurately reproduced.

The recording control circuit 21 controls the interrupt/restart circuit 43 to instruct the encoder 14 to restart the output of the recording data. The encoder 14 goes back by a predetermined number of sectors from the data address of the buffer memory 13 at which the recording interruption occurred and starts reading data in sector units from that sector of the buffer memory 13. The encoder 14 adds a synch byte, a header, an EDC, and an ECC to the read data, performs the CIRC and EFM processes, and adds a subcode, which includes the sub-Q data, and the subcode synchronizing signal to the read data.

The drive signal of the laser drive circuit 16 is constant during data reproduction in the recording restart mode. In other words, the drive signal of the laser drive circuit 16 has a low voltage. Accordingly, laser irradiation does not affect the data recorded on the optical disc prior to the interruption.

The signal synchronizing circuit 42 controls the access control circuit 19 via the recording control circuit 21 and synchronizes the data recorded on the optical disc 32 with the recording data output from the encoder 14. In other words, the signal synchronizing circuit 42 controls the recording control circuit 21 and the access control circuit 19 so that the subcode synchronizing signal of the decoder 7 is synchronized with the subcode synchronizing signal of the encoder 14 and the sub-Q data of the subcode decoding circuit 8 is associated with the sub-Q data of the encoder 14.

The location detection circuit 45 compares the address of the data read from the buffer memory 13 with the address stored in the address memory 47 and activates the restart signal when the data address and the stored address are the same. The address stored in the address memory 47 is the address of the data read from the buffer memory 13 when the recording of data is interrupted. The ATIP address stored in the address memory 48 is the address of the ATIP decoded by the ATIP decoding circuit 10 when the recording of data is interrupted.

When the restart signals of the location detection circuits 45, 46 are simultaneously activated, the retry determination circuit controls the interface 12, the access control circuit 19, and the system control circuit 22 via the recording control circuit 21. The signal synchronizing circuit 42 switches the operational clock of the system clock generation circuit 41 from the reproduction clock to the reference clock when recording is restarted.

Upon the restart of the recording, the address of the data read from the buffer memory 13 shifts to the address next to the address at which data recording was interrupted. Further, the sector location of the optical disc 32 irradiated by the laser beam shifts to the sector location next to the sector location at which data recording was interrupted. In this state, the signal synchronizing circuit 42 synchronizes the recording data output from the encoder 14 with the data recorded on the optical disc 32. Accordingly, the data of the sector next to the sector at which data recording was interrupted is recorded upon the restart of the recording. In other words, sectors of data are recorded without any interruptions when restarting recording. This ensures the continuity of the recorded data while preventing the occurrence of a buffer underrun error.

When the two restart signals of the location detection circuits 45, 46 are not synchronously activated (when the two restart signals are activated at different times), the retry determination circuit 44 repeatedly perform data reproduction in the recording restart mode until the two restart signals are synchronously activated. In other words, if an external disturbance occurs for one reason or another (e.g., the application of an external impact to the CD-R drive), the elements 2–22 of the CD-R drive 1 may function erroneously such that the two restart signals are not synchronously activated. Thus, the retry determination circuit 44 repeats data reproduction to avoid the influence of an external disturbance.

Figure 2A:
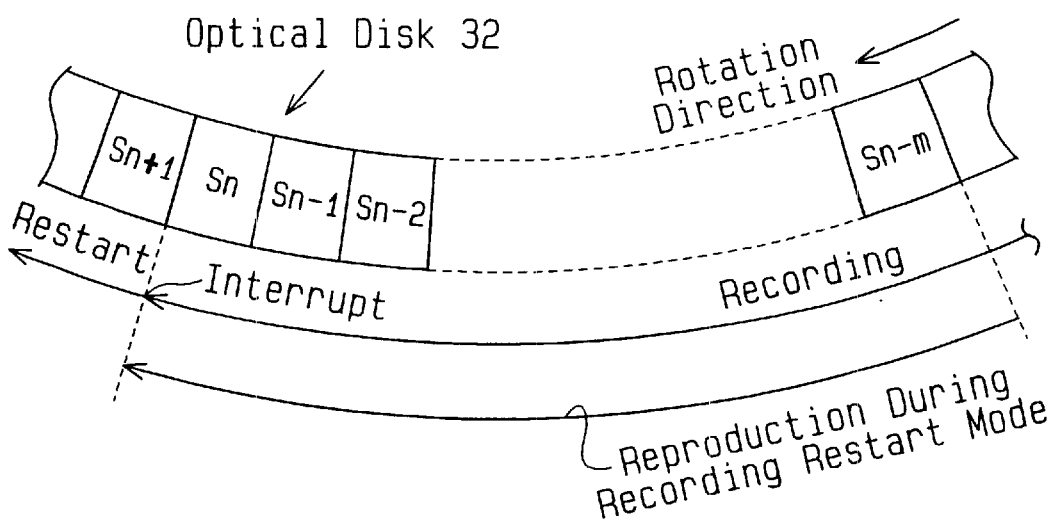
FIG. 2(a) is a schematic diagram showing a sector of an optical disc.
Figure 2B:
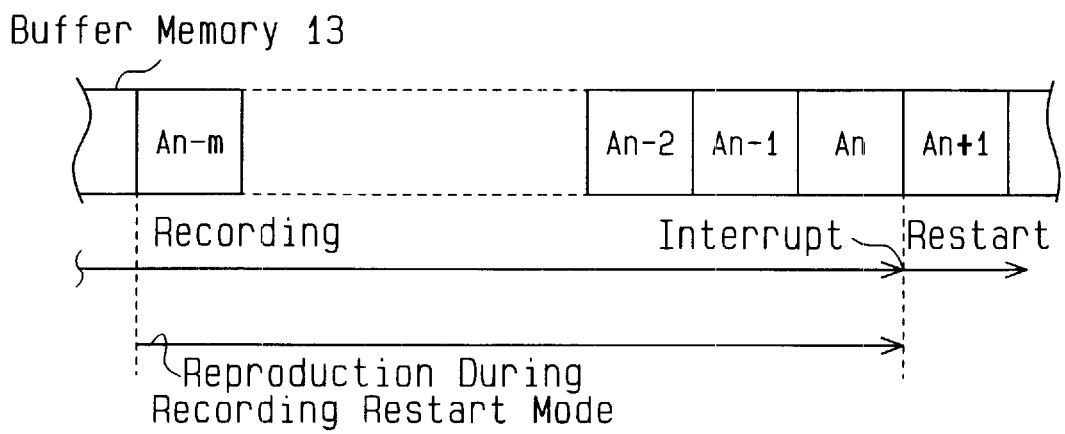
FIG. 2(b) is a diagram illustrating addresses of a buffer memory of the CD-R drive of FIG. 1.

FIG. 2(a) is a schematic view showing a sector of the optical disc 32. FIG. 2(b) is a diagram illustrating the addresses of the buffer memory 13. Sectors Sn+1, Sn, Sn−1, Sn−2, . . . , Sn−m shown in FIG. 2(a) are respectively associated with addresses An+1, An, An−1, An−2, . . . , An−m shown in FIG. 2(b).

During recording, data is read from the buffer memory 13 in the order of addresses An−m, . . . , An−2, An−1, An, and the recording data encoded by the encoder 14 is recorded on the optical disc 32 in the order of sectors Sn−m, . . . , Sn−2, Sn−1, Sn. For example, if the buffer underrun determination circuit 20 determines during the recording of data that a bus underrun may occur at address An, the data of sector Sn, which is associated with address An, is recorded. However, the recording of data is interrupted from the sector Sn+1, which is associated with address An+1.

When the recording of data is interrupted, address An is stored in the address memory 47, and the address of the ATIP decoded from the data recorded at sector Sn is stored in the address memory 48. Afterward, when the buffer underrun determination circuit 20 determines that a buffer underrun is no longer likely to occur, data reproduction in the recording restart mode is commenced from sector Sn−m by going back from sector Sn, at which recording was interrupted, by a predetermined number of sectors (in this case, m sectors).

When data reproduction is commenced, data is read from the buffer memory 13 from address An−m by going back from address An, at which recording was interrupted, by a predetermined number of addresses (m addresses). The read data is encoded into recording data by the encoder 14.

The signal synchronizing circuit 42 synchronizes the recording data output from the encoder 14 with the data recorded on the sectors Sn−m to Sn of the optical disc 32. Then, when the address of the data read from the buffer memory 13 matches the address An stored in the address memory 47, the restart signal of the location detection circuit 45 is activated. When the address of the ATIP decoded by the ATIP decoding circuit 10 matches the ATIP address of the sector Sn stored in the address memory 48, the restart signal of the location detection circuit 46 is activated. When the two restart signals of the location detection circuits 45, 46 are simultaneously activated, the retry determination circuit 44 restarts the recording of data from sector Sn+1, which is next to the sector Sn at which data recording was interrupted.

It is preferred that the predetermined sector number (m sectors) be sufficient for obtaining time period T1, which is required for the spindle serve circuit 3 to control the spindle motor 2 and the head servo circuit 6 to control the optical head 4, and time period T2, which is required for synchronization by the signal synchronizing circuit 42. For example, m is set at 10 to 30. The time periods T1, T2 increase as the recording speed of the CD-R drive 1 becomes higher, for example, as the recording speed increases from 4× to 8×. Accordingly, it is preferred that the predetermined sector number be increased as the recording speed increases.

Figure 3:
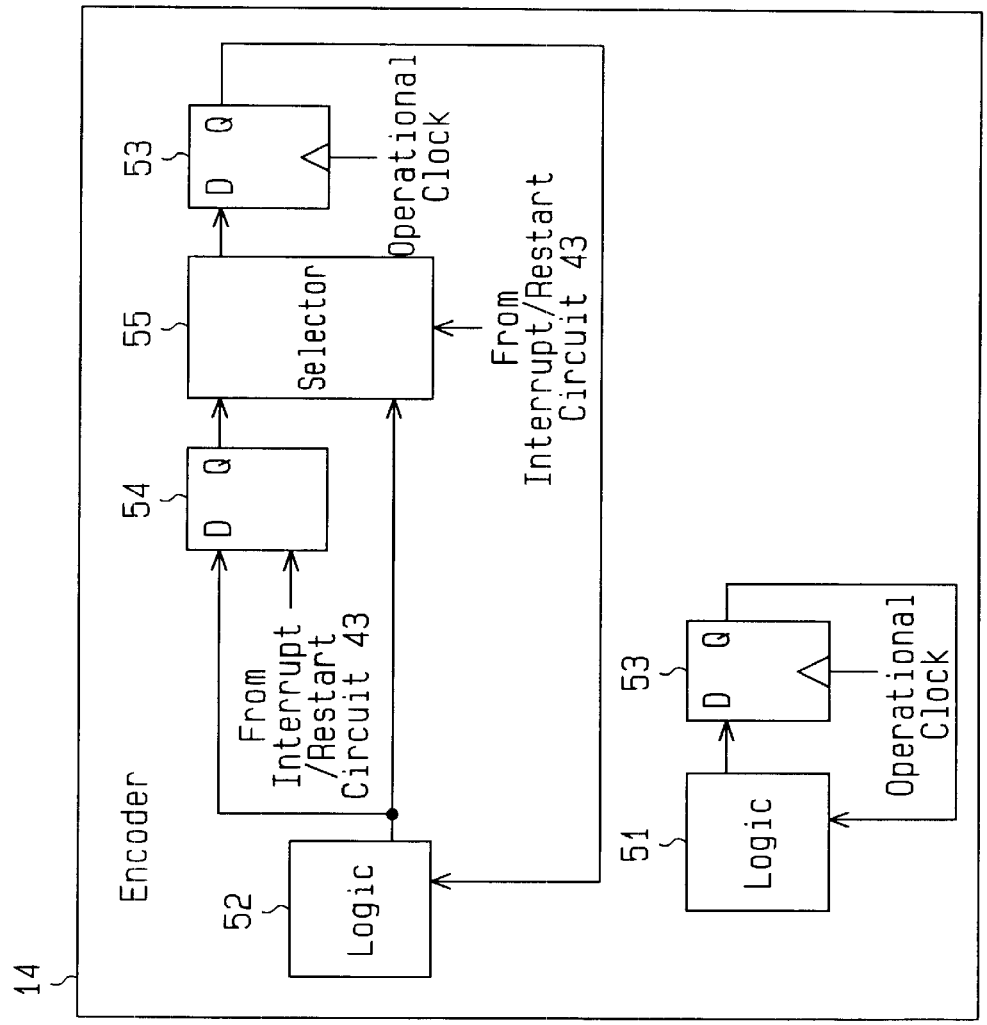
FIG. 3 is a schematic block diagram showing an encoder of the CD-R drive of FIG. 1.

FIG. 3 is a schematic block diagram of the encoder 14. The encoder 14 includes a first control logic 51 and a second control logic 52. The first control logic 51 handles information that does not have to be held during data recording interruptions and is not required when restarting data recording. The second control circuit 52 handles information that must be held during data recording interruptions and is required when restarting data recording (e.g., the polarity of the drive signal generated by the laser drive circuit 16 and digital sum variation (DSV)).

A data flip-flop 53 stores the output information of the first control logic 51 in synchronism with the operational clock of the system clock generation circuit 41. The output information stored in the data flip-flop 53 is returned to the first control logic 51.

The data flip-flop 53 holds the output information of the second control logic 52 via a synchronization flip-flop 54 and a selector 55. The synchronization flip-flop 54 is controlled by the interrupt/restart circuit 43 and stores the output information of the second control logic 52 when data recording is interrupted.

The selector 55 selects the output information held by the synchronization flip-flop 54 if recording is restarted when buffer underrun is no likely to occur and selects the output information of the second logic 52 in other cases. The selected output information is transferred to and held by the data flip-flop 53. Accordingly, the holding of the output information of the second logic 52 is guaranteed when the recording of data is interrupted. This enables usage of the output information held by the second logic 52 when the recording of data is restarted.

The read address of the optical disc 32 or the read address of the buffer memory 13 may reach the address at which data recording was interrupted before the reading of the data recorded on the optical disc 32 is synchronized with the reading of the data stored in the buffer memory 13. In such case, the recording of data is not restarted and data reproduction in the recording restart mode is repeated. Accordingly, if any of the elements of the CD-R drive 1 function erroneously due to an external disturbance, data reproduction is repeatedly performed in the recording restart mode. Thus the effect of an external disturbance is avoided and the occurrence of a buffer underrun error is prevented.

The timing at which the read address of the optical disc 32 matches the address at which an interruption occurred and the timing at which the read address of the buffer memory 13 matches the address at which an interruption occurred are detected. Based on the detection, completion of the synchronization performed by the synchronizing circuit 42 is determined, and the recording is restarted. Accordingly, the circuit configuration of the determination circuit (retry determination circuit 44) is simplified.

It should be apparent to those skilled in the art that the present invention may be embodied in many other specific forms without departing from the spirit or scope of the invention. Particularly, it should be understood that the present invention may be embodied in the following forms.

(1) The present invention may be applied to a data recorder employing the constant angular velocity (CAV) method. In such case, a clock synchronized with the wobble component, which is extracted by the wobble decoder 9, is generated and used as the operational clock during the recording of data.

(2) The access control circuit 19, the buffer underrun determination circuit 20, the recording control circuit 21, and the system control circuit 22 may be replaced by a microcomputer that includes a CPU, a ROM, and a RAM. In other words, the function of each circuit may be achieved by having a microcomputer perform various operations.

(3) The present invention may be applied to a data recorder (e.g., CD-RW drive, MD drive) that uses a rewritable recording medium (e.g., CD-RW standard optical disc, MD standard optical disc). In such case, the occurrence of a buffer underrun error is prevented. This decreases the time required for the recording of data.

(4) The present invention may be applied when data writing is interrupted due to the displacement of the optical head 4. Data writing to the optical disc 32 is also interrupted when the relative position between the optical head 4 and the optical disc 32 is offset due to a physical impact or a mechanical deficiency. In such case, the present invention may be applied to restart the writing of data from the interrupted position. For the restart of data writing, a mechanism for determining the displacement of the optical head 4 may be used in lieu of the buffer underrun determination circuit 20. The displacement determination mechanism may be formed by a vibration sensor, which detects external vibrations of the optical disc 32, a detection circuit, which detects a tracking error of the optical head 4 relative to the optical disc 32, or the like.

The present examples and embodiments are to be considered as illustrative and not restrictive, and the invention is not to be limited to the details given herein, but may be modified within the scope and equivalence of the appended claims.

What is claimed is:

1. A controller for interrupting and restarting data writing to a recording medium, wherein the data is read from a buffer memory, the controller comprising:

an address memory for storing at least one of an address of the recording medium and an address of the buffer memory when the writing of data to the recording medium is interrupted, each address indicating a location of data when the interruption occurred;

a synchronizing circuit for sequentially reading data written to the recording medium prior to the interruption and data stored in the buffer memory prior to the interruption and synchronizing the written data and the stored data; and a restart circuit for restarting data writing to the recording medium when at least one of an address of data read from the recording medium and an address of data read from the buffer memory matches the address stored in the address memory, wherein the restart circuit suspends the restarting and the synchronizing circuit repeats the reading and synchronizing of data when one of the address of the data read from the recording medium and the address of the data read from the buffer memory matches the address stored in the address memory before the synchronizing circuit completes the data synchronization.

2. The controller according to claim 1, further comprising:

a first location detection circuit connected to the address memory, wherein the first location detection circuit detects whether the address of the data read from the recording medium matches the address stored in the address memory; and a second location detection circuit connected to the address memory, wherein the second location detection circuit detects whether the address of the data read from the buffer memory matches the address stored in the address memory.

3. The controller according to claim 2, further comprising a determination circuit for determining whether the synchronizing circuit has completed the data synchronization based on the detections of the first and second location detection circuits.

4. A controller for interrupting and restarting data writing to a recording medium, wherein the data is read from a buffer memory, the controller comprising:

a first address memory for storing an address of the recording medium when the data writing is interrupted, wherein the recording medium address indicates a location of data when the interruption occurred;

a second address memory for storing an address of the buffer memory when the writing of data to the recording medium is interrupted, wherein the buffer memory address indicates a location of the data when the interruption occurred;

a synchronizing circuit for sequentially reading the data written to the recording medium prior to the interruption and the data stored in the buffer memory prior to the interruption while synchronizing the written data and the stored data;

a first location detection circuit for generating a first instruction signal to restart data writing when the address of the data read from the recording medium matches the address stored in the first address memory;

a second location detection circuit for generating a second instruction signal to restart data writing when the address of the data read from the buffer memory by the synchronizing circuit matches the address stored in the second address memory; and a determination circuit connected to the first and second location detection circuits for determining whether to restart the writing of data based on the first and second instruction signals.

5. The controller according to claim 4, wherein the determination circuit restarts data writing when the first and second instruction signals are simultaneously generated.

6. The controller according to claim 4, wherein the determination circuit causes the synchronizing circuit to perform the data synchronization again when the first and second instruction signals are not simultaneously generated.

7. The controller according to claim 4, wherein the data on the recording medium is recorded in sector units, wherein the first address stored in the first address memory corresponds with a recorded data sector, and the address stored in the second address memory corresponds with a data sector stored in the buffer memory.

8. The controller according to claim 4, wherein the data on the recording medium is stored in sector units, and the synchronizing circuit reads data from the recording medium of a sector at an address located a predetermined number of sectors prior to the address at which the interruption occurred and reads from the buffer memory the data of a sector at an address located a predetermined number of sectors prior to the address at which the writing interruption occurred.

9. The controller according to claim 8, wherein the predetermined number of sectors is set so that the number is sufficient for the synchronizing circuit to perform synchronization of the written data and the stored data.

10. A method for controlling data writing to a recording medium when writing is interrupted, wherein the data is read from a buffer memory, the method comprising:

storing at least one of an address of the recording medium and an address of the buffer memory in an address memory when writing to the recording medium is interrupted, each address indicating a location of the data when the interruption occurred;

sequentially reading data written to the recording medium prior to the interruption and the data stored in the buffer memory prior to the interruption;

synchronizing the written data and the stored data;

restarting the writing of data to the recording medium when at least one of an address of the data read from the recording medium and an address of the data read from the buffer memory by the synchronizing circuit matches the address stored in the address memory; and repeating the data reading step and the data synchronizing step when the address of the data read from the recording medium or the address read from the buffer memory matches the address stored in the address memory before completion of the data synchronization in the data synchronization step.

11. A method for controlling data writing to a recording medium when writing is interrupted, wherein the data is read from a buffer memory, the method comprising:

storing an address of the recording medium when writing of data to the recording medium is interrupted, wherein the recording medium address indicates a location of the data when the interruption occurred;

storing an address of the buffer memory when the writing of data to the recording medium is interrupted, wherein the buffer memory address indicates a location of the data when the interruption occurred;

sequentially reading the data written to the recording medium prior to the interruption and the data stored in the buffer memory prior to the interruption;

synchronizing the written data and the stored data;

generating a first instruction signal to restart data writing when the address of the data read from the recording medium matches the address stored in the first address memory;

generating a second instruction signal to restart data writing when the address of the data read from the buffer memory by the synchronizing circuit matches the address stored in the second address memory; and determining whether to restart the writing of data based on the first and second instruction signals.

* * * * *